J. A. DOWD.
THREAD CUTTER.
APPLICATION FILED JUNE 5, 1913.

1,095,090.

Patented Apr. 28, 1914.

WITNESSES

INVENTOR
John A. Dowd
BY
ATTORNEYS

UNITED STATES PATENT OFFICE.

JOHN A. DOWD, OF FALL RIVER, MASSACHUSETTS.

THREAD-CUTTER.

1,095,090.

Specification of Letters Patent.

Patented Apr. 28, 1914.

Original application filed August 13, 1912, Serial No. 714,889. Divided and this application filed June 5, 1913. Serial No. 771,891.

*To all whom it may concern:*

Be it known that I, JOHN A. DOWD, a citizen of the United States, and a resident of Fall River, in the county of Bristol and State of Massachusetts, have invented a new and Improved Thread-Cutter, of which the following is a full, clear, and exact description.

This invention relates to improvements in thread cutters, and is a divisional application from my co-pending application for patent entitled Thread cutting attachment, filed August 13, 1912, and bearing Serial Number 714,889.

The object of the invention is to provide an improved structure which may continually operate for cutting threads on pipes, bars, or the like, and form spaced threaded portions on a given article.

Another object of the invention is to provide a cutter with a threaded peripheral surface which may have said peripheral surface arranged in various forms so as to produce a different arrangement of threads on a given article or bar.

A still further object of the invention is to provide a cutter arranged with the cutting threads or spurs at different distances from the center of the cutter so as to cut either straight or tapering threads on the tube or bar in a continuous operation, these threads or spurs being either formed in spaced banks or in banks contacting with each other.

In carrying out the objects of the invention, a substantially circular or disk-shaped body is provided, formed with cutting threads on the peripheral part thereof, and arranged to engage a bar, tube, or the like, for cutting threads thereon and acting continuously. The cutters forming the subject matter of the invention are substantially circular in shape, but have their cutting surfaces or faces arranged in banks at angles to each other in order to cut tapering threads without any change in any of the parts. The various banks of cutting threads may be, if desired, differently arranged, as for instance abutting or spaced apart, however retaining the idea of some of the threads being farther from the center of the tool than others, which gives the desired taper when the tool is advanced faster than the proportionate rotation of the article being threaded.

A practical embodiment of the invention is represented in the accompanying drawings forming a part of this specification in which similar characters of reference indicate corresponding parts in all the views.

Figure 1:
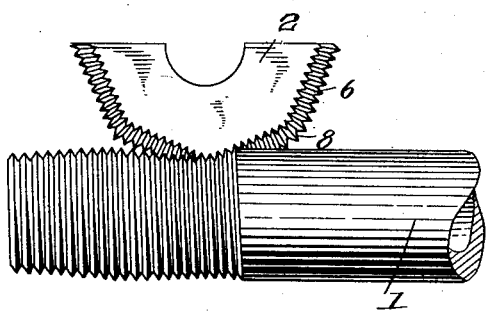
Figure 2:
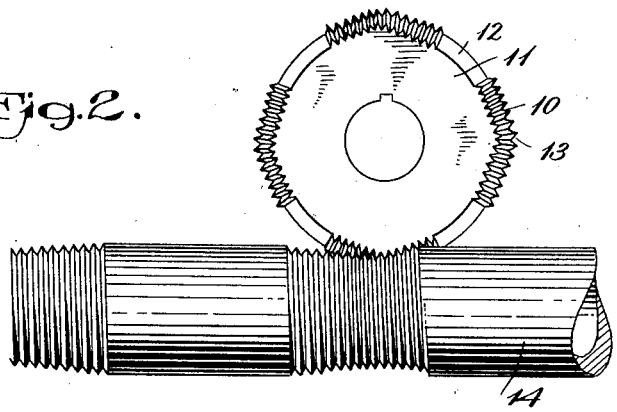

Figure 1 is a fragmentary sectional view of a polygonal cutter and a partially threaded pipe; and Fig. 2 is a front view of the cutter with spaced banks of threads, the same being associated with the pipe partially threaded.

Referring to the accompanying drawings by numerals, 1 indicates a pipe, and 2 the cutter. It will be, of course, understood that the cutter 2 could cut threads upon bars and other articles as well as a pipe, so that the term pipe will be understood as meaning any article adapted to have threads cut thereon.

On the periphery of the cutter are arranged a plurality of banks of cutting threads 6, these banks being formed straight and meeting at points 8, whereby certain parts of each bank of cutting threads is farther from the center of the cutter 2 than the other part. This will cause the sections of pipe 1 to be threaded with a taper, or rather with a double taper. It will be observed that the threads on all of the cutters disclosed are on the periphery, whereby a maximum speed may be attained without injury to the cutter or to the various threads thereof. A suitable driving member may be connected in any desired way with the cutter, as for instance by being keyed thereto so that the cutter may be rotated at any desired rate, while the pipe 1 is also rotated.

In Fig. 4 will be seen another form of cutter, wherein there is provided banks of cutting threads 10 on the cutter 11, these banks being spaced apart by suitable smooth portions 12 closer to the center of the cutter 11 than the lowest thread on any of the banks 10. It will be evident that the portions 12 could be flush with the bottom of the lowest thread of the banks 10 without departing from the spirit of the invention.

Each bank of cutting threads 10 is formed with a point or high portion 13 farther from the center of the cutter 11 than the remaining parts of the particular bank. The threads of the banks 10 may approach the center of the cutter 11 in the arc of a circle, or on a straight line drawn at a tangent. The cutter 11 may be connected with a rotating shaft in any desired manner, as for instance by being keyed thereto so that the cutter may rotate as pipe 14 rotates. By varying the ratio of rotation of pipe 14, and cutter 11, the length of the bevel or tapering threaded portions may be varied, and also the unthreaded portion or space on the pipe 14 between the threaded portions may be varied. This is very desirable where short pipes are desired to be threaded on both ends, or where an extra long nipple is desired where no threads are necessary in the center part. In the structure shown in Fig. 1, the same is designed to thread the entire nipple and to cause the opposite ends of the nipple to be beveled in opposite directions.

In operation and in using the various cutters, the same are designed to be mounted upon a traveling carriage which will move the cutters longitudinally of the pipes being threaded, and which will at the same time rotate the cutters. The power driving the carriage on which the cutters are mounted also rotates the pipe so that both the pipe and cutter are rotated in any desired ratio. The form of the cutter shown in Fig. 2 is designed to produce short sections with threaded ends and a clear or unthreaded portion centrally. It will be observed that the unthreaded portion on the cutter is not equal to the unthreaded portion on the nipple or section of the pipe being cut, and that the taper threaded on the cutter is not equal to the length of the taper threaded on the nipple. The reason for this is that if the carriage on which the cutter is mounted advances at a rate of speed equal to the advancement of the thread which is being cut, the cutters will cut a substantially straight thread. If the carriage that is carrying the cutter was released so as to not be driven but be permitted to move freely in either direction, the continued rotation of the pipe would cause the cutter to revolve backward, the threaded portion acting as a worm and the cutter acting as a worm gear. However, if the carriage is advanced at a speed greater than the advancement of the thread which is being cut, then the rotary cutters will revolve ahead and this is necessary in cutting tapering threads in order to bring the different points of the cutter on the work which is being threaded. If the carriage on which the cutters are mounted is advanced at a rate of speed equal to twice the advancement of the thread, the space on the cutter will be equal to half the space on the nipple, or both, and the length of the taper on the thread will be equal to half of the taper on the threaded section being cut. The cutters can be driven or advanced at any rate of speed greater than the advancement of the thread, but for practical work not greater than the advancement of the work multiplied by the number of the cutters.

From this it will be observed that various cutters may be used at different times and may be caused to advance at different speeds according to various circumstances, and the particular variety desired, namely whether the sections or nipples are to be beveled on the end or whether or not the thread is to extend from one end of the nipple to the other. It will be observed that any desired number of cutters can be used for threading a given work, and consequently a maximum speed may be utilized without in any way injuring the work or the machine.

Having thus described my invention I claim as new and desire to secure by Letters Patent:—

1. In a cutter of the class described, a body portion formed with spaced banks of cutting threads on the periphery, each bank of threads being set at an angle to the next adjacent bank of threads.

2. In a device of the character described, a cutter formed cylindrical or disk-shaped, said cutter having threads on the periphery, said threads being arranged in spaced sets of banks, each set of banks being substantially V-shaped.

3. In a device of the character described, a cutter formed with a body having spaced banks of threads on the periphery, said threads being struck on the arc of a circle substantially conforming to the work designed to be cut, and with a pitch corresponding to the size of the threads.

4. A cutter formed with a substantially disk-shaped body having spaced banks of cutting threads on the periphery, the threads of each bank being arranged substantially as a unit and said banks of cutting threads being set at such an angle to each other as to form successive raised threaded portions.

5. In a device of the character described, a substantially circular cutter having spaced raised portions on the peripheral face of the cutter, said spaced raised portions being threaded on their peripheral face.

6. In a device of the character described, a substantially circular cutter formed of a single piece having spaced raised portions having diverging threaded surfaces, said threaded surfaces being formed on the peripheral face of the cutter.

7. In a device of the character described, a substantially circular cutter formed of a single piece having spaced threaded raised portions, the center of said portions being farthest from the center of the cutter, said threaded raised portions being formed on the peripheral face of the cutter, the threads of said portions being arranged substantially in a straight line.

8. In a device of the character described, a substantially circular cutter formed of a single piece having banks of cutting threads set at an angle to each other, each of said banks of cutting threads being set at a tangent and the threads in each bank being arranged as a unit.

In testimony whereof I have signed my name to this specification in the presence of two subscribing witnesses.

JOHN A. DOWD.

Witnesses:
 JOHN T. MORIARTY,
 JOHN T. CAREY.